(12) United States Patent
Dykes

(10) Patent No.: US 9,586,657 B1
(45) Date of Patent: Mar. 7, 2017

(54) BOAT FOLDING TABLE

(71) Applicant: Jonathan M Dykes, Shoreline, WA (US)

(72) Inventor: Jonathan M Dykes, Shoreline, WA (US)

(*) Notice: Subject to any disclaimer, the term of this patent is extended or adjusted under 35 U.S.C. 154(b) by 63 days.

(21) Appl. No.: 14/565,476

(22) Filed: Dec. 10, 2014

Related U.S. Application Data

(60) Provisional application No. 61/915,548, filed on Dec. 13, 2013.

(51) Int. Cl.
| | |
|---|---|
| *B63B 7/08* | (2006.01) |
| *B63B 29/04* | (2006.01) |
| *A47B 3/00* | (2006.01) |
| *A01K 97/10* | (2006.01) |
| *A47B 3/12* | (2006.01) |
| *A47B 13/08* | (2006.01) |
| *A47B 13/00* | (2006.01) |
| *B63H 16/06* | (2006.01) |
| *B63B 35/71* | (2006.01) |

(52) U.S. Cl.
CPC ............. *B63B 29/04* (2013.01); *A01K 97/10* (2013.01); *A47B 3/12* (2013.01); *A47B 13/003* (2013.01); *A47B 13/088* (2013.01); *B63B 7/08* (2013.01); *B63B 7/085* (2013.01); *B63B 35/71* (2013.01); *B63H 16/06* (2013.01); *B63B 2029/046* (2013.01); *B63B 2035/715* (2013.01)

(58) Field of Classification Search
CPC ....... B63B 2007/003; B63B 7/04; B63B 7/08; B63B 7/085; B63B 29/04; B63B 2029/046; B63B 35/71; B63B 2035/715; B63H 16/06; B63H 2016/063; A47B 5/04; A47B 13/003; A47B 13/088; A47B 13/16; A01K 97/10
USPC ........ 114/194, 195, 343, 345–347, 352–354, 114/363, 364; 441/35, 40–46; 297/158.4, 297/159.1
See application file for complete search history.

(56) References Cited

U.S. PATENT DOCUMENTS

| | | | | |
|---|---|---|---|---|
| 2,353,013 | A * | 7/1944 | Clark | ........................ B63B 7/00 114/354 |
| 2,396,148 | A * | 3/1946 | Bean | ........................ B63B 7/04 118/125 |
| 2,734,555 | A * | 2/1956 | Kroner | .................... A01K 97/22 114/363 |
| 2,830,308 | A * | 4/1958 | Green | ........................ B63B 7/06 114/354 |
| 5,362,063 | A | 11/1994 | Cummings | |
| 6,725,798 | B1 * | 4/2004 | Hill | ......................... B63B 1/121 114/347 |
| 6,755,145 | B2 | 6/2004 | Bolebruch | |
| 6,964,243 | B1 | 11/2005 | Thompson | |
| 7,146,927 | B1 * | 12/2006 | Wright | .................... A01K 97/06 114/347 |
| D542,568 | S | 5/2007 | Clark | |

* cited by examiner

*Primary Examiner* — Ajay Vasudeva
(74) *Attorney, Agent, or Firm* — Thomas E. Kelly

(57) ABSTRACT

Disclosed herein are folding tables for use on small boats like kayaks and canoes, including inflatable kayaks. Such tables are secured to the gunwales or topsides of such small boats and have various devices for organizing and securing sportsman's gear for fishing, hunting, photographing and the like. The tables are readily detachable from the boats and foldable for compact storage.

11 Claims, 3 Drawing Sheets

BOAT FOLDING TABLE

Disclosed herein are folding tables for use on small boats such a kayaks and canoes as an aid to recreation activities such as fishing, photography and hunting, boats equipped with such tables and methods of making and using such tables.

BACKGROUND OF THE INVENTION

Tables have also been designed for boating activities. See U.S. Pat. No. 7,146,927 for a table adapted to be hung from canoe gunwales; U.S. Pat. No. 6,755,145 for a tray adapted to be attached to the cockpit of a rigid kayak; and U.S. Pat. No. 6,964,243 for a soft accessory pack for use on a kayak.

Folding tables have been used for various applications. See U.S. Pat. No. 5,362,063 for a description of a folding lap board useful as a game table and U.S. Pat. No. D 542,568 S for a description of a folding table adapted to be supported by sofa cushions.

SUMMARY OF THE INVENTION

This invention provides center-folding tables adapted for mounting onto the gunwales of a small boat such as a kayak or canoe wherein the tables have accessories to aid in recreation activities and have means for holding the table open and securing the open table to the boat. In the case of an inflatable boat the gunwale corresponds to the top of the inflation tubes forming the sides of the boat. The table is secured to the boat at lines or fasteners mounted on the sides or gunwale of the boat. Kayaks and canoes have some popularity with sportsmen engaged in fishing, hunting, camping and nature photography, providing convenient access to remote water locations. One challenge for the sportsman is that kayaks and canoes can tend to be relatively less stable than larger boats creating challenges in organizing and securing equipment for sporting activities. The folding table of this invention addresses many of the long felt challenges to organizing and securing equipment on kayaks and canoes. The invention thus also encompasses kayaks and canoes having a center-folding table secured thereto. An advantage of the tables of this invention is that they are readily detachable from the boat and foldable into a compact size for storage or transportation, e.g. in a backpack.

BRIEF DESCRIPTION OF THE DRAWINGS

The several views of the drawings illustrate aspects of the invention. In particular

DETAILED DESCRIPTION

Figure 1:
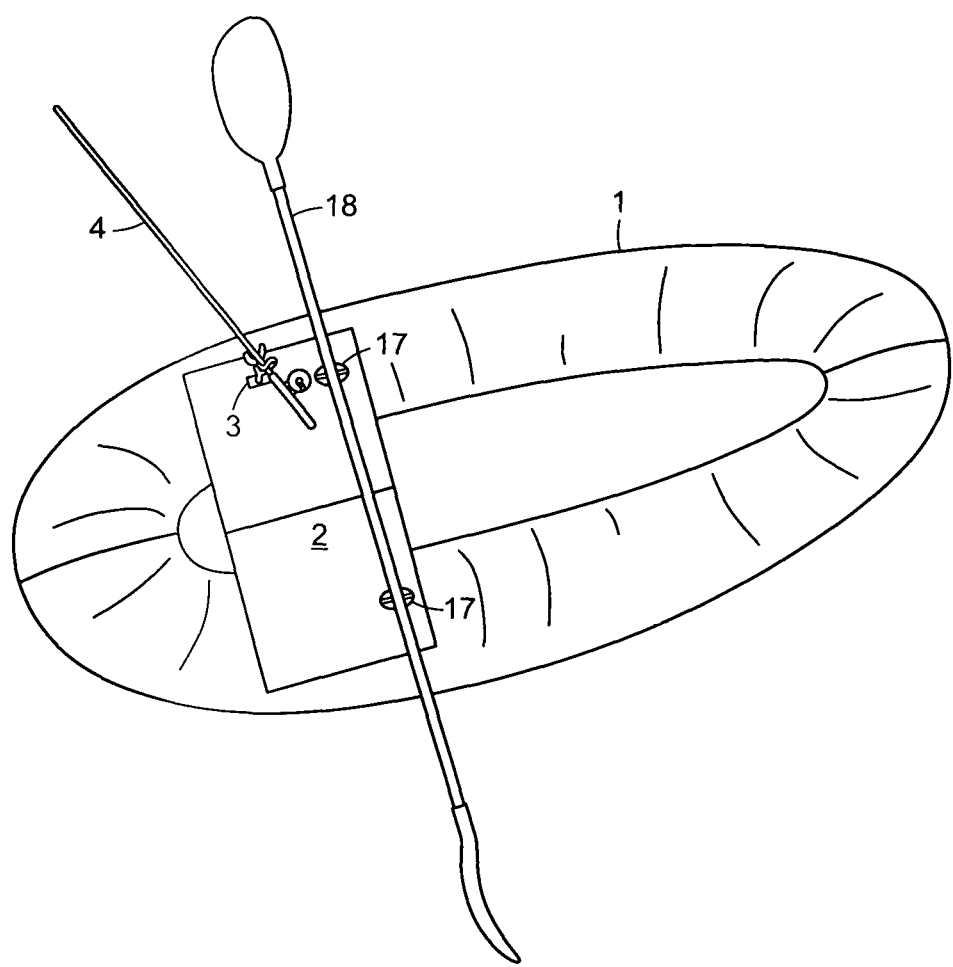
FIG. 1 shows a boat folding table on an inflatable kayak where a fishing rod and kayak paddle are mounted on the table.

With reference to FIG. 1 there is shown an inflatable kayak 1 with a folding table 2 mounted on the inflation tubes of the kayak. When mounted onto a rigid boat the table will sit on the gunwales. The folding table comprises two, rigid, hinge-connected panels made from any of a variety of durable materials including wood such as plywood, plastic such as polyethylene, polypropylene, nylon, polycarbonate, polyacrylate, ABS and PVC, metal such as aluminum, composite sheet such as glass or carbon fiber-filled resin sheet and metal/plastic bonded laminate such as aluminum bonded to a polyethylene core. Preferred panels will be lightweight and of low density to allow flotation in water. The panels should be thick enough to provide durability from stress expected in use; depending on the material of construction, useful thickness of polyethylene panels can be in the range of ⅜ of an inch to ¾ of an inch; for example, ½ inch thick polyethylene panels have been shown to be sufficiently durable for fabricating folding tables for use on inflatable kayaks. The folding table shown in FIG. 1 is equipped with a rod holder 3 holding a fishing rod 4 and open-top clips 17 and 17 to secure the shaft of kayak paddle 18.

Figure 2A:
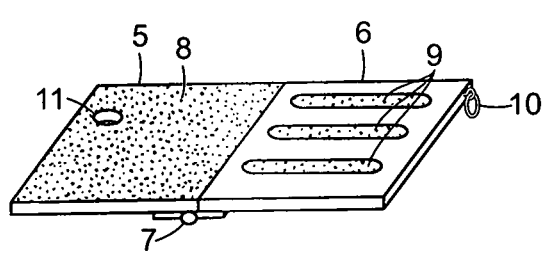
FIGS. 2A through 2G shows various features and embodiments of a boat folding table.

With reference to FIG. 2a through FIG. 2g there are shown various embodiments of the folding table. FIG. 2a shows a folding table fully extended and comprising panels 5, 6 with a hinged connection provided by hinge 7. The hinge can be a single piano hinge extending the centerfold dimension of the table or two or more short hinges along the centerfold length of the table. The entire top surface of panel 5 as shown in FIG. 2a can be coated with a non-skid surface 8 such as rubberized coating commonly available from marine suppliers or rubber lamination. As an alternative embodiment the top surface of panel 6 is shown as having strips of rubberized material 9 such a strips of silicone rubber. The rubber surfaces on the tops of the panels provide slip resistance and traction to minimize the chances of sporting gear from sliding off of the table.

Figure 2B:
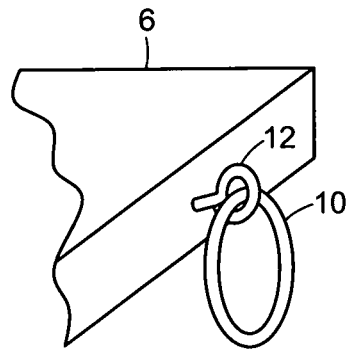

With reference to FIG. 2b there is shown one means for fastening the table to a boat comprising a ring 10 which is secured to the table 6 by eye screw 12 inserted into the outer edge of the panel. A table will have at least two means for fastening the table—one on each extended edge of the open table—and typically four means—one at each corner of the open table. The open table can be secured to the boat using straps, hooks or line connected to ring 10 and a corresponding means for fastening on the boat such as a security or safety line, a ring or guide cemented to the side of the boat on the flotation tube (shown later in FIG. 3). Straps for connecting the table to the boat can have hook and loop (Velcro brand) fasteners or releasable clasps or hooks such a carabiner hooks or can be elastic straps with hook ends commonly known as bungee cords. Alternatively, the table can be fastened to the boat using line lashed through rings and fastening points on the boat. Alternatively, hook and loop fastener components could secure the bottom surface of the table to the top surface of the side of the boat.

Figure 2C:
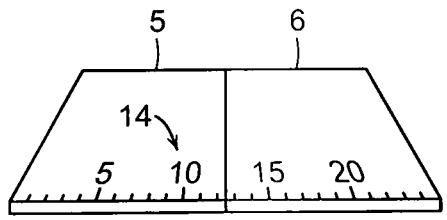

With reference to FIG. 2c there is shown a table with a useful feature in the form of a linear scale 14 along an edge of the table, e.g., along the edge adjacent to the cockpit or on other edges. The scale can be printed, laminated or embossed into the surface of the table as an aid in legal fishing.

Figure 2D:
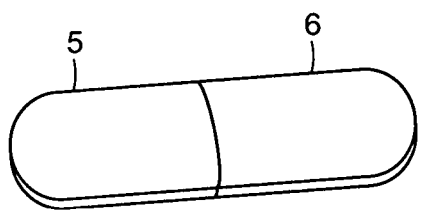

The shape of the panels 5 and 6 can vary depending on the shape of the open table. Useful shapes of open tables include rectangular as shown in FIG. 2a, trapezoidal as shown in FIG. 2c and oval as shown in FIG. 2d.

Figure 2E:
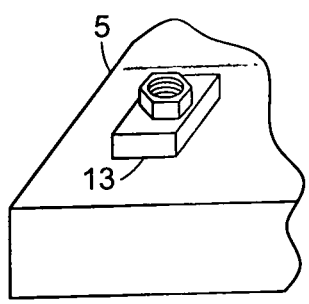

With reference to FIG. 2e there is shown a threaded nut adapter 13 secured to the top of the table having a hole which can be threaded for mounting accessories such as threaded fishing rod holders, gun holders, camera supports and the like. Adapter 13 can be bolted to the table or can comprise a fastener with a threaded hole embedded in the table and essentially functions as a threaded nut embedded in the table; a common form of such an adapter useful in a wooden table is called a T-nut.

Figure 2F:
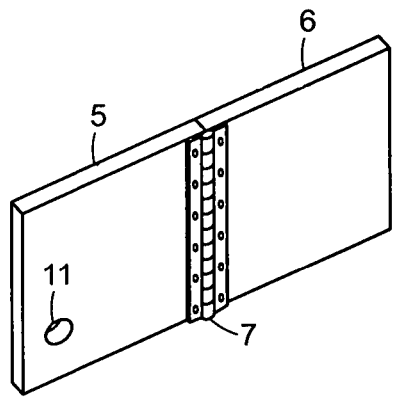
Figure 2G:
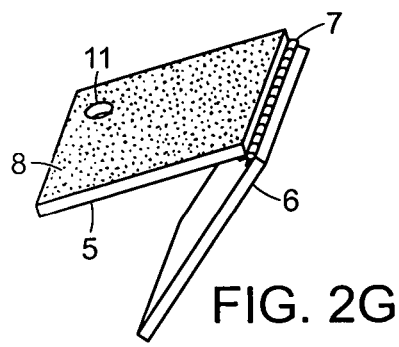

FIG. 2f shows the underside of the table of FIG. 2a where hinge 7 is a piano hinge extending the center of the table to connect panels 5 and 6. Alternatively, the hinge connection can be made with two or more short hinges. In one corner of panel 5 there is shown a hole 11 which can serve as an alternative means for fastening the table to the boat. Practically there will be two holes on opposite sides of the table or four holes in the corners of the table. FIG. 2g shows the table of FIG. 2a in partially folded configuration.

Figure 3:
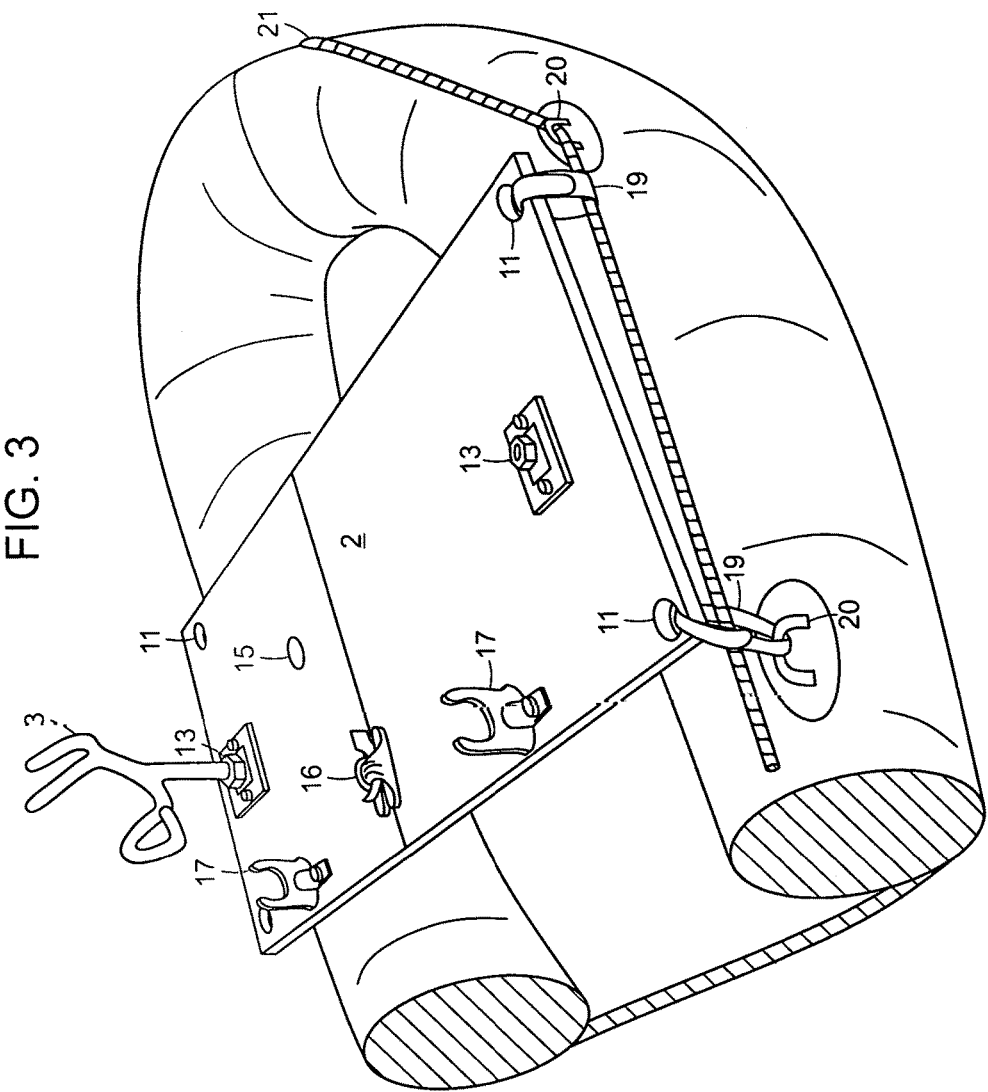
FIG. 3 shows one embodiments of a boat folding table attached to the top of an inflatable boat (partial view).

FIG. 3 illustrates one popular embodiment of the table for use on inflatable kayaks where the front section of an inflatable kayak is illustrated. On table 2 there is a magnet 15 inserted into the top of the table; such magnets are useful for holding fishing gear such as lures, flies, hooks, swivels and connectors or tools such a knives and pliers. Also at each side of the table there is shown a threaded nut adapter 13 affixed, e.g., by screws, to the surface of the table; threaded into one of the threaded nut adapters is a fishing rod holder 3. Also shown on the table in FIG. 3 are two open-top clips 17 which are useful for securing the handle of a kayak paddle.

At the centerfold hinged connection of the table there is a window sash lock 16 installed across the centerfold hinged connection which serves as a means for holding the panels extended into an open table by restraining hinge movement. An alternative means for holding the panels extended is a bar laying transverse across the centerfold hinged joint and secured by brackets, bolts or locking screws. Still another alternative means for holding the panels extended comprises a channel, e.g. an extruded metal channel shape with an opening corresponding to the width of the panels that allows the channel to fit snugly over an edge of both panels of the open table extending across the centerfold hinged connection to assist in maintaining the panels extended into an open table.

Also shown in FIG. 3 at two side corners are straps 19 running through holes 11 to fasten the table to the boat; one strap is wrapped around security line 21 and the other strap is run through guide loop 20. The straps are shown as overlapping with type hook and loop fasteners. Alternatively, the straps could be secured with releasable clips, hooks or snaps.

The invention is disclosed and described herein by way of alternative embodiments of common mechanical and physical devices with a known function, such as panels, hinges, locks, hooks, lines, straps and fasteners, which are assembled in the described innovative way to provide the folding table; it is understood that the scope of the broadest claims below cover alternatives of the disclosed component devices to provide a variety of embodiments of the folding table.

What is claimed is:

1. An inflatable kayak with inflation tube sides providing gunwales, connected to a center-folding table comprising two rigid, rectangular, plastic panels having a hinged connection and a window sash lock mounted across the hinged connection to restrain folding of said panels; wherein said hinged connection allows the panels to be extended into an open table or folded together with respective bottom surfaces meeting; wherein said sash lock engages top surfaces of said panels; wherein said table is attached to said gunwales by straps running through holes at corners of the table; and wherein said table has a linear scale, a fishing rod holder threaded into a threaded nut adapter affixed to the table, magnets and open-top clips for securing a kayak paddle to said table.

2. A center-folding table consisting of
  (a) two rigid panels, wherein each panel has a top surface having means for holding recreation tools and a bottom surface,
  (b) a hinged connection allowing the panels to be extended into an open table or folded together with bottom surfaces meeting,
  (c) means for holding the panels extended into an open table, wherein said means for holding the panels engages the top surfaces of the panels to restrain folding movement of the hinged connection, and
  (d) means for mounting said table onto gunwales of a boat, wherein said means for mounting comprises holes at corners of the table when said panels are extended into an open table.

3. The table of claim 2 having a shape, when said panels are extended, that is oval, rectangular or trapezoidal.

4. The table of claim 3 wherein said means for mounting further comprises one or more of straps, hooks, rings and lines.

5. The table of claim 4 wherein said one or more of straps, hooks, rings and lines cooperate with said holes for fastening the table to gunwales of a boat.

6. The table of claim 2 wherein said means for holding recreation tools comprises one or more of (a) a component strip of a hook and loop fastener, (b) a magnet embedded in said table, (c) a non-slip coating, (d) a threaded nut adapter affixed to or embedded in said table, and (e) a open-top clip.

7. The table of claim 6 wherein said threaded nut adapter is connected with a threaded rod of a fishing rod holder, a firearm holder, a camera holder, a net holder, or a paddle holder.

8. The table of claim 2 having at least two open-top clips for receiving handle shaft of a paddle and securing said paddle to the top surface of the table.

9. The table of claim 2 wherein said means for holding the panels extended into an open table comprises a window sash lock, a bar lying transverse across the hinged connection, or a channel shape extending across the hinged connection.

10. A center-folding table with a top surface having means for holding recreational tools and a bottom surface wherein said table is adapted for mounting onto flotation tubes of an inflatable kayak, wherein said table consists of two rigid, rectangular, plastic panels having a hinged connection allowing the panels to be extended into an open table or folded together with bottom surfaces meeting; a lock engaging the top surfaces for holding the panels extended into an open top table; wherein said panels have holes at corners of the extended panels for fastening said table to the flotation tubes; wherein said means for holding recreation tools comprise at least one of (a) a pair of open-top clips for securing a kayak paddle to said table, (b) a magnet, (c) a threaded nut adapter and (d) a linear scale.

11. The table of claim 10 wherein said plastic panels are between ⅜ of an inch and ¾ of an inch in thickness.

* * * * *